Figure 2:
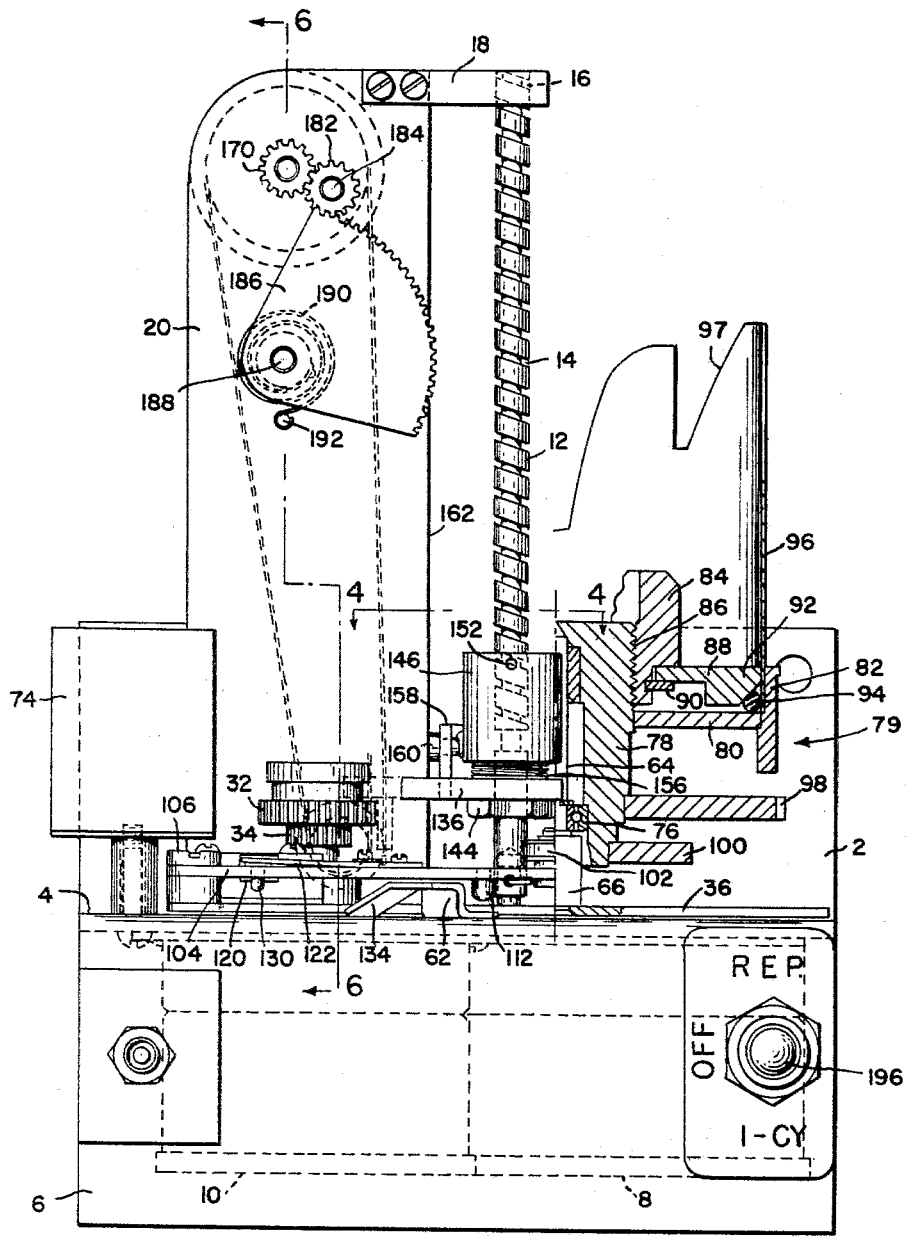

May 3, 1966  N. BREWER  3,248,963
CAM RESPONSIVE CONTROLLER
Filed Jan. 22, 1964  4 Sheets-Sheet 1
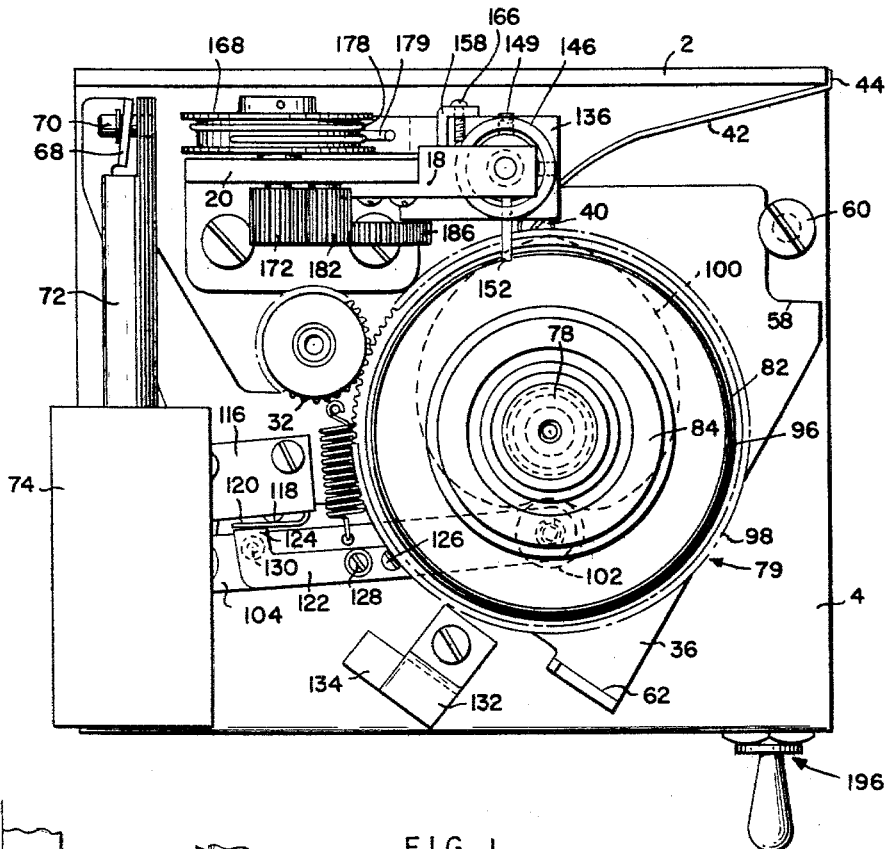
FIG. 1.
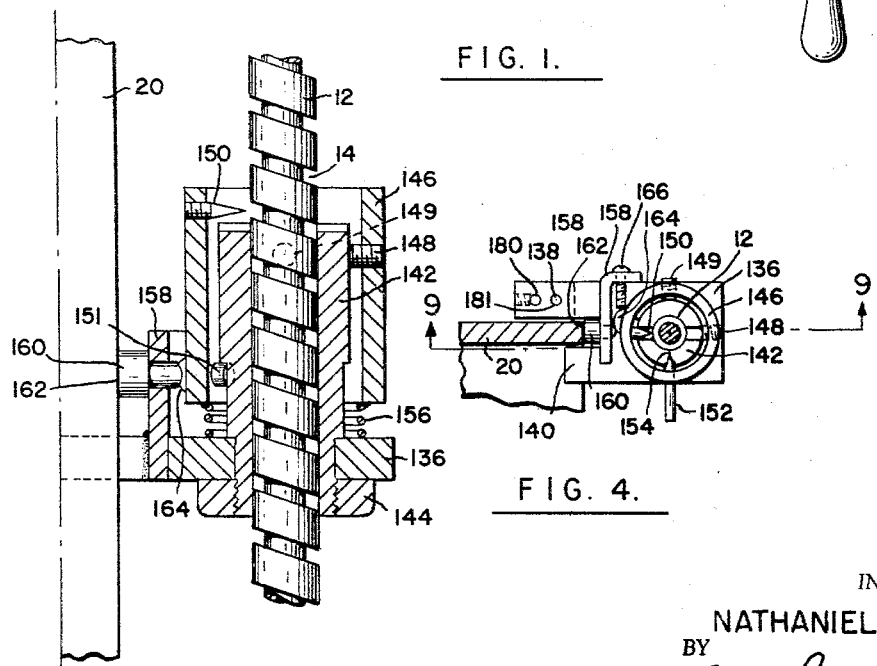
FIG. 8.
FIG. 4.
INVENTOR.
NATHANIEL BREWER
BY
ATTORNEYS May 3, 1966 N. BREWER 3,248,963
CAM RESPONSIVE CONTROLLER
Filed Jan. 22, 1964 4 Sheets-Sheet 2

INVENTOR.
NATHANIEL BREWER
BY
ATTORNEYS

May 3, 1966 N. BREWER 3,248,963
CAM RESPONSIVE CONTROLLER
Filed Jan. 22, 1964 4 Sheets-Sheet 3

INVENTOR.
NATHANIEL BREWER
BY
ATTORNEYS

May 3, 1966  N. BREWER  3,248,963
CAM RESPONSIVE CONTROLLER
Filed Jan. 22, 1964  4 Sheets-Sheet 4

INVENTOR.
NATHANIEL BREWER
BY
ATTORNEYS

United States Patent Office 3,248,963
Patented May 3, 1966

3,248,963
CAM RESPONSIVE CONTROLLER
Nathaniel Brewer, Newtown, Pa., assignor to Fischer & Porter Company, Warminster, Pa., a corporation of Pennsylvania
Filed Jan. 22, 1964, Ser. No. 339,509
9 Claims. (Cl. 74—424.8)

This invention relates to cam responsive controllers and has particular reference to such a controller which is compact, for which the cams may be very readily produced, and which has the outstanding characteristic that a very sharp cam rise may be followed. The controller may be used for the control of mechanical, pneumatic, hydraulic or electrical control devices which in turn control process variables.

Controllers for process variables are well known in a great variety of forms and, in general, involve elements which are variably located in accordance with some variable input quantity. The input quantity may be practically any measurable variable. What we are concerned with here is control of such a device by an input variable which is a function of some other variable. This last variable, for simplicity, will be considered to be time and the following description will relate to the use of a variable input which is a function of time. As will become apparent hereafter, the input may be a function of some other measurable quantity.

Devices have been provided which involve control by a function of time, the function being determined by the contour of a cam driven by a clockwork, electrical or otherwise. The commonest form of such device involves a disclike cam driven along with, or similarly to, the conventional circular recording chart used in controllers. A follower is mechanically driven by the cam. This type of arrangement has various drawbacks in that a bulky arrangement is involved and the cams are difficult to lay out because of their polar form.

Prior controllers of this type have also either been unable to follow step or other abrupt changes of the function or have been able to do so only through the use of elaborate servo arrangements.

In accordance with the present invention, the cam is in the form of a card of plastic material having a substantial degree of stiffness but capable of being disposed in a cylindrical form so as to be mounted in a carrier driven in accordance with the independent variable (time) about its axis. Because of the fact that in its flat form this cam may be laid out with rectangular coordinates, and cut to shape, the making of the cam is very simple and straightforward. As will appear more fully hereafter, the cam is required to do very little mechanical work which may be accomplished by the cam card even though it has substantial flexibility. The flexibility prevents jamming in the event that the rate of change of the independent variable is rapid. A mechanical servo arrangement is provided which actually drives the cam follower in response to small forces exerted on the follower. Because of the servo arrangement, steps in the cam-defined function may be followed without jamming.

Provision is made for resetting by either manual manipulation or through electrical connections from a remote point.

Figure 3:
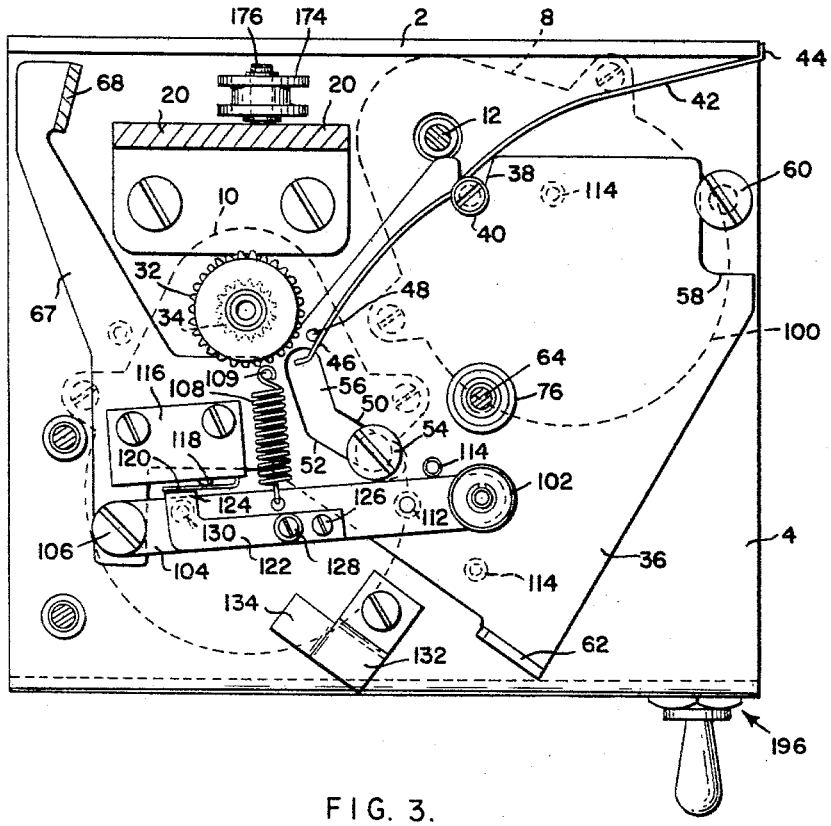
Figure 5:
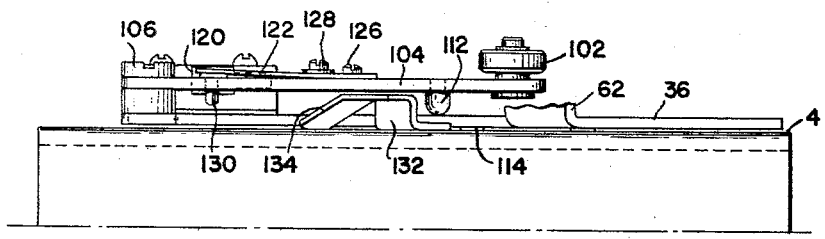
Figure 7:
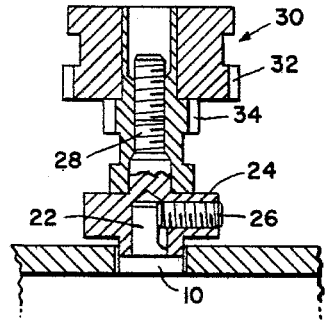
Figure 6:
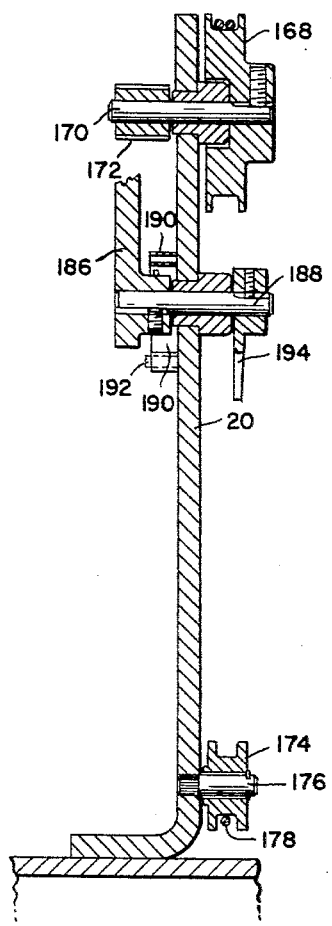
Figure 9:
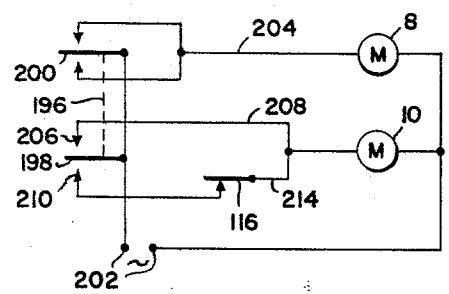

Provisions are also made so that the control will stop after a single cycle or, alternatively, repeat the cycle. The objects of the invention relate to the attainment of the foregoing results and these as well as others relating to details of construction and operation will become apparent from the accompanying drawings, in which:

FIGURE 1 is a plan view of the controller;
FIGURE 2 is an elevation, partly in section, of the controller;
FIGURE 3 is a horizontal section taken generally below the cam carrier to show parts adjacent to a base plate of the controller;
FIGURE 4 is a horizontal section taken along the plane indicated at 4—4 in FIGURE 2;
FIGURE 5 is a fragmentary elevation showing details;
FIGURE 6 is a vertical section taken on the broken surface indicated at 6—6 in FIGURE 2;
FIGURE 7 is a fragmentary vertical section showing the arrangement of drive gearing;
FIGURE 8 is an enlarged vertical section showing details of the cam follower; and
FIGURE 9 is a schematic diagram of the electrical connections involved.

The base of the controller may be formed of sheet metal, suitably shaped and indicated at 2, a part of which provides a horizontal platform 4 while another part provides a vertical skirt 6. A pair of synchronous clock-type motors are provided at 8 and 10. These may have the usual internal gearing to provide suitable speed drive of their output shafts. The shaft of the motor 8 extends vertically and is coupled to a screw 12 which is in the form of a cylindrical shaft having a helical groove 14 cut therein. The upper end of this screw is mounted in a bearing opening 16 in a horizontal bracket 18 carried by an upright bracket member 20 secured to the platform 4. The screw 12 is driven counterclockwise as viewed in plan at a relatively rapid speed: for example, it may be driven at a speed of thirty revolutions per minute. With a pitch, for example of one-eighth inch, this screw will raise a follower at a sufficient speed to cause it to rise along a substantially vertical edge of the cam.

Referring to FIGURE 7, the shaft 22 of the motor 10 has an adapter 24 secured thereto by a set screw 26, the adapter being provided with an upper threaded portion 28 on which there may be secured a driving pinion assembly indicated generally at 30 and comprising the two pinions 32 and 34. As shown in FIGURE 7, the upper pinion 32 is in driving position to mesh with a gear secured to the cam carrier. But by inverting the pinion assembly 30 the alternative pinion 34 may be located in driving position. The pinion 32 may, for example, have twice the pitch diameter of the pinion 34, and the possibility of the alternative use of these pinions for driving makes possible two different drive speeds for the cam. With the pinion 32 active for driving, for example, the clock motor 10 may be chosen to drive the cam through one revolution in twelve hours, while if the pinion 34 is used to effect drive the cam may be driven one revolution in twenty-four hours. The internally geared clock motor may be chosen to secure any desired rate depending on the length of the cam cycle which is desired.

Referring particularly to FIGURE 3, a movable plate 36 is provided which has a somewhat complex movement relative to and parallel with the base 4. The plate 36 is provided with a slot 38 embracing the shank of a shoulder screw 40 threaded into the platform 4. A strong spring 42 wound about the shank of screw 40 has one end 44 engaging the frame and its other end 46 engaging a pin 48 secured in the plate 36 to urge the plate clockwise, as viewed in FIGURE 3, about the screw 40. As will appear, the action of the spring 42 retains a driven gear in mesh with one or the other of the pinions 32 and 34. For further positioning of the plate and holding it downwardly against rise relative to the platform 4, the plate 36 is provided with a slot 50 having one portion 52 embracing the shank of a shoulder screw 54 in the position illustrated in FIGURE 3 and a portion 56 extending at an angle to the portion 52. The portion 52 of the slot is approximately concentric with the bottom of the slot 38 while the portion 56 of the slot is approximately concentric with a shoulder 58. A screw 60 is secured in the platform 4. The head of this screw 60 overlaps a portion of the edge of the plate 36 extending beyond the shoulder 58 which, when the plate is in normal position, is spaced from the screw 60. The plate 36 has an upturned portion 62 which may be engaged by the thumb of an operator to swing the plate 36 counterclockwise. When this is done, the plate 36 has sequential motions as follows:

First, it rotates about the screw 40, with the portion 52 of slot 50 sliding along the screw 54. The purpose of this motion will be clearer hereafter, but it is to disengage a driven gear from one or the other of the pinions 32 and 34, the possibility of this motion also providing for the difference in location of the gear in its respective meshed positions with the two pinions. As will also be seen later, since the motion is about the screw 40, the relationship of the cam follower relative to the cam is unchanged during the motion just described. As the motion continues, the shoulder 58 abuts the screw 60 and at this time the screw 54 is in the portion 56 of the slot 50. Further motion then rocks the plate 36 effectively about the screw 60 and the slot 38 slides over the screw 40. This portion of the motion is effective to remove the cam from the follower.

An arm 67 of the plate 36 has an upturned portion 68 to which there is connected through the pivot 70 the plunger 72 of a solenoid 74. This solenoid may be energized from a remote position to effect movements of plate 36 such as described.

The plate 36 supports a vertically arranged pin 64 through a connection 66, and at the lower end of this pin there is provided the ball bearing 76 on which is mounted the hub 78 of the cam carrier 79. The hub carries the disc 80 fixed thereto which in turn mounts a circular flange 82. The hub 78 is threaded at 86 to mount the nut 84 on which the disc 88 is rotatably mounted by means of the spring collar 90. The plate 88 is provided with a conical surface 92 arranged to be tightened down upon a rubber ring 94 to cause the latter to clamp against the flange 82 the lower end of the cam card 96. The inner surface of the flange 82 has a circumference closely approximating the length of the cam card 96 when in its flat, developed position.

The cam card 96 is desirably made of a plastic material such as Mylar sufficiently thin (e.g. 0.015" thick) to be flexible and curved into a cylinder as indicated but sufficiently stiff to exert operating force on a pin carried by a cam followed as will be shortly described. The flexibility is sufficient to prevent jamming, but for normal operating purposes the cam may be considered as essentially rigid. The upper edge is contoured as indicated at 97 to provide the proper function, in this case, of time.

The advantage of the cam card is that it may be readily laid out in rectangular coordinates which may be marked thereon, if desired; the abscissa representing time and the variable ordinates the values of the time-function which is to effect control. It has been found convenient to provide this cam card of the same size as the usual cardboard tabulating cards used in computers, in which case openings may be punched therein under keyboard or other control delineating the variation of the control function with time. In the latter case a scissors may be used to cut the upper edge of the cam card along a line of holes punched in the card; whereas if the card is laid out in rectangular coordinates and the function is marked thereon by a pencil line the cutting may follow this line. Convenience of layout of the cam is thus afforded, the card being sufficiently thin so that cutting requires only a scissors and not some machining operation. As will appear more fully later, a servo arrangement is provided which will follow accurately the upper contour of the card, even vertical rises thereof.

The hub 78 has secured to it the gear 98 which is at a level to mesh with the uppermost of the pinions 32 and 34. Meshing occurs due to action of the spring 42 on the plate 36.

Below the gear 98 and also secured to the hub 78 is a heart-shaped cam 100, the contour of which is shown in FIGURE 1. This is of a type for effecting restoration of the cam carrier to an initial position and for this purpose cooperates with a roller 102 mounted on the end of a lever 104 which is pivoted at 106 to the plate 36, the roller 102 being urged into contact with the cam 100 by the action of a spring 108 secured at one end to the lever 104 and at its other end to a pin 109 secured in the plate 36. To provide for low-friction movement, a pin 112 of Teflon or the like is secured in the lever 104 and bears against the plate 36. At this point it might also be noted that the plate 36 has low-friction movements relative to the platform 4 due to the provision of similar pins 114 of Teflon or the like secured in the platform and supporting the plate.

A microswitch 116 is secured to the plate 36 and has its operating plunger 118 engageable by a spring arm 120. When the pin 118 is released the switch 116 is closed. Cooperating with the spring arm 120 is the end 124 of a spring 122 secured to the lever 104 at 126 and having its upward motion restrained by a screw 128. The spring 122 overlies the head of a pin 130 vertically slidable in the lever 104 and having its end projecting below the lower surface of this lever. The pin acts as a vertically slidable plunger and is engageable with the ramp 134 of a member 132 secured to the platform 4, the engagement occurring as the plate 36 is moved toward its extreme counterclockwise position.

The operation of the switch by its associated parts is as follows:

At the end of a cycle of operation the roller 102 will be in its innermost position as illustrated in FIGURE 3 and the end 124 of spring 122 will engage the spring arm 120 to open the normally closed contacts of switch 116, this result being due to the action of the strong spring 108. When operation proceeds, the roller 102 will be rocked outwardly from the shaft of the cam and after a short angle of revolution the spring arm 120 will be released so that the switch 116 will close. At the end of the cycle the roller 102 will again engage the low portion of the cam 100 and the switch 116 will be again opened, the spring 122 remaining throughout these operations in its lowered position so that its path is below the upper edge of the arm 120.

If, again starting from the rest position of FIGURE 3, it is considered that the plate 36 is rocked counterclockwise by manual or electrical operation, the switch 116 and lever 104, both mounted on the plate 36 will move therewith, with the end 124 of arm 122 retaining the switch in opened position. But if the locking is to the extent of engagement of the pin 130 with the cam ramp 134, the pin will be moved upwardly pushing upwardly the end 124 of spring 122 and raising it above the upper edge of the spring arm 120 which is then released to move outwardly to effect closing of the switch. When the plate 36 is then permitted to rotate clockwise under the action of spring 42, as the pin 130 moves down the ramp the end 124 of spring 122 will drop on the upper edge of the spring arm 120 but will not push it inwardly to open the switch. As restoration to normal starting position occurs, the switch 116 then remains closed, and the cycle controlled by this switch will restart. After a short angular movement of the cam 100 the arm 104 will be rocked sufficiently to cause the end 124 to clear the spring arm 120 whereupon the spring 122 will again drop below the level of this upper edge in position for subsequent engagement to reopen the switch.

Reference may be next made particularly to FIGURES 1, 2, 4 and 8. The cam follower comprises elements mounted on a member 136 which is slotted to provide portions 138 and 140 on opposite faces of the vertical bracket 120. Rotation of member 136 is thus prevented. A screw having a central bore has an elongated cylindrical head 142 and its threaded portion extends downwardly through the member 136 and is secured by the nut 144. The screw 12 extends through the smooth bore in the screw 142. Surrounding the screw 142 is a cylindrical member 146 which has substantial internal clearance with the screw head as indicated in FIGURES 4 and 8. A pair of screws 148 and 149 are threaded through the cylindrical member 146 and extend inwardly to provide stops cooperating with the screw head, limiting leftward and forward movements of the member 146. As illustrated in FIGURES 4 and 8, a pin 150 extends inwardly from the inner cylindrical surface of the member 146 in which it is fixed, and when the parts are in normal position the inner end of this pin has slight clearance with the screw 12. In similar fashion a pin 152 is secured through the member 146 and has its inner end 154 normally in a position slightly clearing the screw 12. Each of the last mentioned pins has a reduced end capable of entering the groove 14 in the screw.

A spring 156 urges the cylindrical member 146 upwardly to the position of seating of a pin 151 against a shoulder of the screw 142. While this spring is a light one, it urges the cylindrical member 146 to a position in which the member is substantially concentric with the axis of the screw 12, clearing the screw head 142. The spring will yield to an upward force imparted to the pin 152 to permit rearward tilting of the member 146 to bring the pin end 154 into engagement with the groove 14 of the screw 12; and a slight force applied to move the pin 152 toward the right as viewed in FIGURE 4 will also cause tilting against the action of the spring 156 to bring the end of the pin 150 into engagement within the groove 14.

A bracket 158 secured to the member 136 mounts slidably a pin 160 having a head engaging flatwise the vertical edge 162 of the bracket 20. A cam 164 carried by the lower end of the cylindrical member 146 is arranged to engage the inner end of the pin 160 when the member 146 is slightly rotated counterclockwise as viewed in FIGURE 4. This imparts a frictional drag on movement of the follower to prevent hunting. A screw 166 is provided to limit clockwise movement of the cam 164.

Referring next particularly to FIGURES 1, 2 and 6, a pulley 168 is secured to a shaft 170 mounted in a bearing in the bracket 20, and a pinion 172 is secured to the end of this shaft. A second pulley 174 is mounted on a stud 176 secured in the bracket 20. A pair of cords 178 and 179 are anchored in the pulley 168 and at their other ends in the openings 180 and 181 in the arm 138 of the member 136, the arrangement being such, as will be evident from the drawings, as to impart rotation to the pulley 168 proportional to the movement of the follower assembly along the axis of the screw 12. Movements are positively imparted in both directions by the arrangement being described.

An idler 182 meshes with the pinion 170 and is rotatably mounted on a stud 184 secured in the bracket 20. The idler 182 also meshes with the gear sector 186 which is secured to a shaft 188 having a bearing in the bracket 20. A spiral spring 190 has one end anchored to the hub of the gear sector and its other end anchored to a fixed pin 192 in the bracket 20, and urges the sector in a clockwise direction as viewed in FIGURE 2. This spring, it will be noted, by reason of this arrangement aids the weight of the follower assembly to move that assembly downwardly.

The shaft 188 is the output shaft of the controller and may be connected in any suitable way, as through a linkage connected to a lever 194 secured to it, to the setting device, lever or the like, of a process controller. Such controllers are well known and need not be illustrated. Despite their details, they involve some setable element which may be operated from the shaft 188 and which determines the control to be effected. For example, supposing a program of temperature variation with respect to time is to be maintained, the cam of the present apparatus will effect positioning of the shaft 188 to effect positioning, in turn, of the set point control device of the associated controller which in turn will attempt to control the process to maintain some measured temperature at the desired set temperature value. It will be obvious to those skilled in the art that pressures, flows, volumes, etc. may be similarly controlled, with the set points varying with time.

Reference may now be made to FIGURE 9 which shows the electrical connections which may be involved. Motors 8 and 10 and normally closed switch 116 shown in the diagram have already been described. A main manually operable switch 196 has movable contacts 198 and 200 which are connected to one of the terminals 202 of a commercial power line, the other terminal having returns from the motors 8 and 10 connected thereto. The switch 196 has three positions, the central position being "off" in which the movable contacts 198 and 200 are disconnected from fixed contacts. The upper and lower positions of the switch are adapted to provide alternatively continuous cycling and single cycle operation. As will be seen from the diagram, when the switch 196 is in either of the closed positions the motor 8 will be energized through connection 204. When the switch is in its upper position movable contact 198 engages contact 206 which is connected to the motor 10 through lead 208, so that so long as this switch is in the upper position the motor 10 will be energized. When the switch is in its lower position its movable contact 198 engages a fixed contact 210, in the lead 214 from which to the motor 10 there is interposed the switch 116. As will appear, this arrangement involves automatic stopping of the controller after a single cycle.

The overall operation may now be described as follows:

Assuming that a reset has been effected by counterclockwise rocking of the plate 36 either manually or electrically (through energization of solenoid 74) and that the plate 36 has been released, the action of the roller on the heart-shaped cam 100 will have restored the controlling cam holder and the controlling cam 96 to initial position, this occurring as soon as the gear 98 has been disengaged from the pinion 32 or 34 which is being used and the full resetting movement has occurred to move the cam 96 beyond the end of the pin 152. It is desirable that in the reset position the portion of the cam which would be engageable by the pin 152 presents to this pin its lowermost position. This, however, is not essential. If the switch 196 is in either its upper or lower position to provide energization of the motors, the motor 8 will be rotating the screw 12 relatively rapidly as already described, and the motor 10 will be operating. Due to the resetting action previously described, the switch 116 will be closed so that the motor 10 will be operating even if the switch is in its lower position.

It may be here noted that even if the end of the pin 152 abutted the cam 96 in the reset position the gears would not fail to mesh because, as will be seen from the drawings, the end of the pin 152 is nearly aligned with the screw 40 about which final pivoting occurs as the gears move toward meshing position.

The cam 96 moves clockwise as viewed in FIGURE 1. If the rotation presents a raising effect on the pin 152, the pin will be moved toward the right (FIGURE 1) and this will cause the end of the pin 150 to move correspondingly so that its end will be picked up by the screw by engagement within the groove 14 thereof and the follower assembly will then act as a nut to be moved upwardly by rotation of this screw. This upward movement will cease as soon as the pin 152 is released by the cam to move toward the left under the action of the light spring 156, and the pin 152 will then ride on the edge of the cam, moving upwardly again if the cam exerts a right-hand force. A similar operation occurs if the pin is engaged by the cylindrical surface of the cam 96, though in this case the inner end 154 of the pin 152 will be engaged in the groove 14.

It will now be seen that even a vertical rise presented by the cam 96 will be followed. Generally the cam will be moving at a much slower rate than that of raising of the follower by the screw 12, but even if the cam is rotating rather rapidly, the greater speed of rotation of the screw will effect the upward movement of the follower with, perhaps, slight distortion of the edge of the cam 96 which is permitted by reason of its flexible nature. Accordingly, jamming will not occur.

Whenever the cam 96 presents a lowering edge to the pin 152, the assembly will be free to drop under its weight aided by the action of the spiral spring 190. Lowering stops as soon as the pin 152 engages the cam. A substantially vertical drop will thus also be properly followed by the follower.

As will be evident, the gear sector 186 and its shaft 188 move in proportion to the movement of the follower to effect set point control as already indicated.

During the initial part of the rotation of the cam 96, the cam 100 rocks the arm 104 outwardly so that the end 124 of spring 122 is withdrawn from the spring arm 120. If the controller had been in continuous recycling operation, this action will permit the switch 116 to return to its normally closed position. If single cycle operation was involved and resetting had occurred, the switch will already have been in its normally closed position. During the second half of the revolution the lever 104 will be moved in the reverse direction as roller 102 rides down the contour of cam 100, and as the lowermost portion of this cam is reached by the roller the arm 104 through the spring 122 and its end 124 will engage the spring arm 120 to open the switch. If the switch 196 is in its upper position for continuous recycling, the motor 10 will remain energized. But if switch 196 is in its lower position, the opening of switch 116 will de-energize the motor 10 and operation will stop until resetting is accomplished by movement of the plate 36 as already described.

The foregoing describes the operations occurring in the controller as specifically disclosed. However, the arrangement may be utilized with minor change to provide an output which is a function of a variable other than time which may vary in value in both directions. In such case, instead of using a motor such as 10 for the drive of the cam 96 a servo-motor, of Selsyn type, for example, may be used to drive the cam 96 in both directions of rotation. For example, the rotary position of the cam 100 may be a linear function of pressure, temperature, flow rate or the like. It will be obvious that if the cam 96 may move back and forth that the follower arrangement need only be modified to the extent of providing a second pin such as 150 opposite that shown so that forces applied in either direction to the pin 152 will produce engagement of the follower to the continuously rotating screw 12. Steps of the cam 96 in both directions may thus be followed to provide an output bearing any desired functional relationship to the independent variable which controls the position of the cam 96. Quite high or quite low portions of the cam 96 may be used to provide signals through the output connection to the shaft 188. Using the controller in this fashion as a function generator it is, of course, unnecessary to provide the resetting and cycle-controlling devices which have been described.

It will be evident from the foregoing that various changes in details of construction and operation may be made without departing from the invention as defined in the following claims.

What is claimed is:

1. In combination, a cam having a controlling edge, means mounting said cam for movement to traverse its controlling edge past a follower path, a follower device, a continuously moving follower driving member, and means guiding the follower device along said follower path, said follower device comprising an element engageable with said controlling edge, and means controlled by engagement of said element by said controlling edge to couple the follower device to said driving member for drive thereby in a direction to disengage the element from said controlling edge.

2. In combination, a cam of resilient sheet material having substantial stiffness having a controlling edge, means mounting said cam for movement to traverse its controlling edge past a follower path, a follower device, a continuously moving follower driving member, and means guiding the follower device along said follower path, said follower device comprising an element engageable with said controlling edge and means controlled by engagement of said element by said controlling edge to couple the follower device to said driving member for drive thereby in a direction to disengage the element from said controlling edge.

3. In combination, a cam of cylindrical form having a controlling edge, means mounting said cam for rotary movement about its axis to traverse its controlling edge past a follower path, a follower device, a continuously moving follower driving member, and means guiding the follower device along said follower path, said follower device comprising an element engageable with said controlling edge, and means controlled by engagement of said element by said controlling edge to couple the follower device to said driving member for drive thereby in a direction to disengage the element from said controlling edge.

4. In combination, a cam of cylindrical form and of rsilient sheet material having substantial stiffness having a controlling edge, means mounting said cam for rotary movement about its axis to traverse its controlling edge past a follower path, a follower device, a continuously moving follower guiding the follower device along said follower path, said follower device comprising an element engageable with said controlling edge, and means controlled by engagement of said element by said controlling edge to couple the follower device to said driving member for drive thereby in a direction to disengage the element from said controlling edge.

5. In combination, a cam having a controlling edge, means mounting said cam for movement to traverse its controlling edge past a follower path, clock means driving said mounting means, a follower device, a continuously moving follower driving member, and means guiding the follower device along said follower path, said follower device comprising an element engageable with said controlling edge, and means controlled by engagement of said element by said controlling edge to couple the follower device to said driving member for drive thereby in a direction to disengage the element from said controlling edge.

6. In combination, a cam having a controlling edge, means mounting said cam for movement to traverse its controlling edge past a follower path, a follower device, a continuously moving follower driving member, and means guiding the follower device along said follower path, said follower device comprising an element engageable with said controlling edge, and means controlled by engagement of said element by said controlling edge to couple the follower device to said driving member for drive thereby in a direction to disengage the element from said controlling edge, said follower driving member comprising a continuously rotating screw, and said means comprising a member engageable by a thread of said screw under said controlling action of said element.

7. In combination, a cam having a controlling edge, means mounting said cam for movement to traverse its controlling edge past a follower path, a follower device, a continuously moving follower driving member, and means guiding the follower device along said follower path, said follower device comprising an element engageable with said controlling edge, means controlled by engagement of said element by said controlling edge to couple the follower device to said driving member for drive thereby in a direction to disengage the element from said controlling edge, and means operable to reset said cam to an initial position.

8. In combination, a cam having a controlling edge, means mounting said cam for moveemnt to traverse its controlling edge past a follower path, clock means driving said mounting means, a follower device, a continuously moving follower driving member, and means guiding the follower device along said follower path, said follower device comprising an element engageable with said controlling edge, means controlled by engagement of said element by said controlling edge to couple the follower device to said driving member for drive thereby in a direction to disengage the element from said controlling edge, and means operable to reset said cam to an initial position.

9. In combination, a cam having a controlling edge, means mounting said cam for movement to traverse its controlling edge past a follower path, clock means driving said mounting means, a follower device, a continuously moving follower driving member, and means guiding the follower device along said follower path, said follower device comprising an element engageable with said controlling edge, means controlled by engagement of said element by said controlling edge to couple the follower device to said driving member for drive theerby in a direction to disengage the element from said controlling edge, and means for terminating the movement of the cam after a predetermined time.

No references cited.

DON A. WAITE, *Primary Examiner.*

LEONARD HALL GERIN, *Examiner.*